(12) United States Patent
Choi

(10) Patent No.: US 7,654,558 B2
(45) Date of Patent: Feb. 2, 2010

(54) A-PILLAR STRUCTURE OF CURTAIN AIRBAG

(75) Inventor: Hyeong Ho Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 273 days.

(21) Appl. No.: 11/542,421

(22) Filed: Oct. 3, 2006

(65) Prior Publication Data

US 2007/0126215 A1   Jun. 7, 2007

(30) Foreign Application Priority Data

Dec. 1, 2005   (KR) .................. 10-2005-0116552

(51) Int. Cl.
*B60R 21/213* (2006.01)
(52) U.S. Cl. .................................. 280/728.2
(58) Field of Classification Search ............. 280/730.2, 280/728.2; 52/716.5, 716.6, 208; 296/39.1, 296/193.06
See application file for complete search history.

(56) References Cited

U.S. PATENT DOCUMENTS

| | | | |
|---|---|---|---|
| 6,179,359 B1 * | 1/2001 | Clauson et al. | 296/39.1 |
| 6,402,188 B1 * | 6/2002 | Pasch | 280/728.2 |
| 6,431,584 B1 * | 8/2002 | Nagasawa et al. | 280/728.2 |
| 6,824,201 B2 * | 11/2004 | Miyazaki | 296/193.06 |
| 6,832,800 B2 * | 12/2004 | Hwang | 296/39.1 |
| 7,077,449 B2 * | 7/2006 | Tokunaga | 296/39.1 |
| 7,178,205 B2 * | 2/2007 | Nessel et al. | 24/289 |
| 7,410,189 B2 * | 8/2008 | Choi | 280/730.2 |
| 7,454,826 B2 * | 11/2008 | Nessel et al. | 29/453 |
| 2001/0052210 A1 * | 12/2001 | Mizutani et al. | 52/208 |
| 2002/0024202 A1 * | 2/2002 | Kubota et al. | 280/730.2 |
| 2003/0094828 A1 * | 5/2003 | Nagamoto | 296/39.1 |
| 2003/0146607 A1 * | 8/2003 | Ohki | 280/730.2 |
| 2004/0160078 A1 * | 8/2004 | Hwang | 296/39.1 |
| 2007/0126215 A1 * | 6/2007 | Choi | 280/730.2 |
| 2009/0096193 A1 * | 4/2009 | Robins | 280/728.2 |

* cited by examiner

*Primary Examiner*—Paul N Dickson
*Assistant Examiner*—Karen Jane J Amores
(74) *Attorney, Agent, or Firm*—Morgan, Lewis & Bockius LLP

(57) ABSTRACT

The present invention relates to an A-pillar mounting structure of a curtain airbag. In particular, an A-pillar mounting structure in which an upper mounting member of a boss of an A-pillar trim is separated from the during deployment of an airbag and the trim separated from the A-pillar is prevented from going far away by a cap that is prevented from being scattered by a cap scattering preventing means connected to a mounting member or a trim connecting means. The present invention relates to an A-pillar mounting structure in which a curtain airbag is installed and to which an A-pillar trim is coupled. The A-pillar trim includes an A-pillar trim boss for connecting the A-pillar trim to an A-pillar, and an upper mounting member provided to an upper end of the A-pillar trim boss and formed to be separable from the A-pillar trim boss during deployment of the curtain airbag.

3 Claims, 8 Drawing Sheets

A-PILLAR STRUCTURE OF CURTAIN AIRBAG

CROSS-REFERENCE TO RELATED APPLICATION

This application claims priority to Korean Patent Application No. 10-2005-0116552 filed in the Korean Intellectual Property Office on Dec. 1, 2005, the disclosures of which are incorporated herein by reference.

BACKGROUND OF THE INVENTION (a) Field of the Invention

The present invention relates to an A-pillar mounting structure for a curtain airbag in which an upper mounting member of a boss of an A-pillar trim is separated from the boss during deployment of an airbag. A cap is prevented from being scattered by means connected to a mounting member or a trim connecting means which prevents the separated A-pillar trim from being separated from the A-pillar so that a passenger is prevented from being hurt by the separated A-pillar or the scattered cap.

(b) Description of the Related Art

FIG. 1 is a perspective view of an A-pillar in which a curtain airbag is installed. FIG. 2 is a cross-sectional view taken along a line A-A of FIG. 1. FIG. 3 is a cross-sectional view taken along a line B-B of FIG. 1. Referring to FIG. 1, a curtain airbag 9 is disposed above a side glass of a vehicle along an A-pillar 81, and it is deployed in response to a broadside collision so as to spread out along a side surface within a vehicle. Referring to FIG. 2, the airbag 9 is installed within an A-pillar trim 84 in a portion of the A-pillar 81 of a portion of a frame of a windshield glass 83. Referring to FIG. 3, the airbag 9 is installed within an indoor roof member 85 in a portion of a frame in a portion of a roof 82. In particular, as shown in FIG. 2, when the airbag is deployed from a portion of the A-pillar 81 of a portion of a frame of the windshield glass 83, the A-pillar trim 84 must be separated from the A-pillar.

FIG. 4 is a cross-sectional view taken along a line C-C of FIG. 1 showing a conventional A-pillar trim mounting structure, and FIG. 5 is a cross-sectional view taken along a line C-C of FIG. 1 showing another A-pillar trim mounting structure. In a structure as shown in FIG. 4, the A-pillar trim 84 is fitted into the A-pillar 81 by a fitting member 85. In a conventional structure as shown in FIG. 4, if the airbag 9 is deployed, the fitting member 85 is separated so that the A-pillar trim 84 is separated. At this time, the trim is separated to go away by deployment of the airbag, and the separated trim may collide with a passenger so that the passenger may be hurt. In addition, in a structure as shown in FIG. 5, a boss is formed in an A-pillar trim 84', and an upper end of the boss is coupled to the A-pillar 81 by a bolt 86. A cap 87 covers a lower end of the boss. In a structure as shown in FIG. 5, it is difficult for the curtain airbag 9 to be deployed, and the A-pillar trim 84' is broken during deployment of the airbag so that the curtain airbag may be damaged or a passenger may be hurt by being hit by the broken trim. In addition, the cap 87 may be scattered to hurt a passenger.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an A-pillar mounting structure for a curtain airbag in which a trim is separated from a vehicle body without forming a sharp part during deployment of an airbag. The separated A-pillar trim is prevented from being separated from the A-pillar by more than a predetermined distance so that it is prevented that the A-pillar collides with a passenger so as to hurt the passenger, thereby preventing the cap from being scattered.

An exemplary embodiment of the present invention provides an A-pillar mounting structure in which a curtain airbag is installed and to which an A-pillar trim is coupled. The A-pillar trim includes an A-pillar trim boss for connecting the A-pillar trim to an A-pillar, and an upper mounting member provided to an upper end of the A-pillar trim boss which is formed to be separable from the A-pillar trim boss during deployment of the curtain airbag. A coupling means is fixed to the A-pillar through the upper mounting member so that the A-pillar trim is coupled to the A-pillar. This structure enables the A-pillar trim to be easily separated from the A-pillar while preventing the A-pillar trim from being broken into sharp bits.

The A-pillar mounting structure may further include a cap. A receiving portion for receiving the cap may be formed at a lower end of the A-pillar trim boss of the A-pillar trim, and the cap may be connected to the coupling means or the mounting member through a cap scattering preventing means. Accordingly, the cap is prevented from being scattered, and the A-pillar trim can be prevented from being gone away from the A-pillar by the cap.

The upper mounting member may be integrally formed with the A-pillar trim boss with a thinner thickness than the A-pillar trim boss, and a plurality of slots may be radially formed from a coupling hole formed at a center of the mounting member.

The upper mounting member may be integrally formed with the A-pillar trim boss by a plurality of supporting ribs.

The upper mounting member may have an overlapping member and may be inserted into an upper end of the A-pillar trim boss from an inner side thereof.

DETAILED DESCRIPTION OF THE EMBODIMENTS

An exemplary embodiment of the present invention will hereinafter be described in detail with reference to the accompanying drawings.

Figure 1:
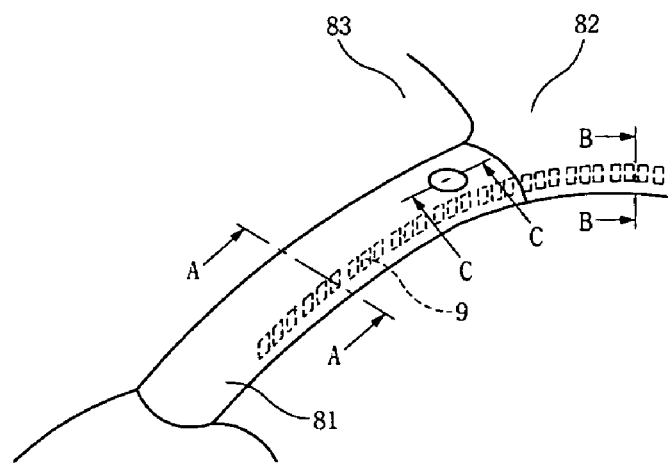
FIG. 1 is a perspective view of an A-pillar in which a curtain airbag is installed.
Figure 2:
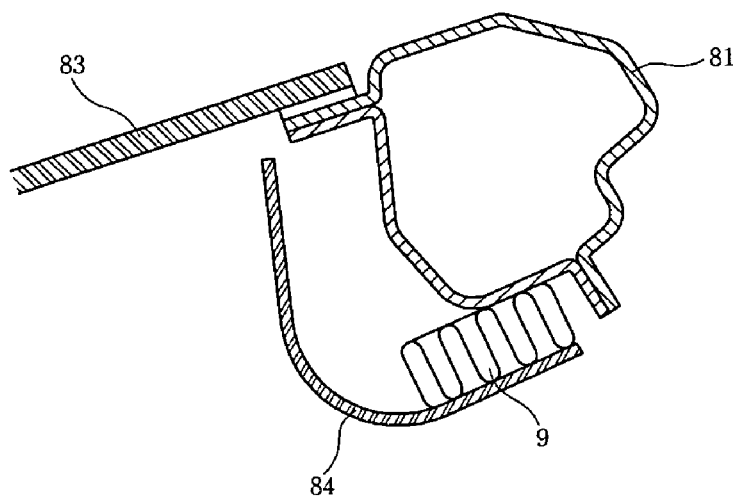
FIG. 2 is a cross-sectional view taken along a line A-A of FIG. 1.
Figure 3:
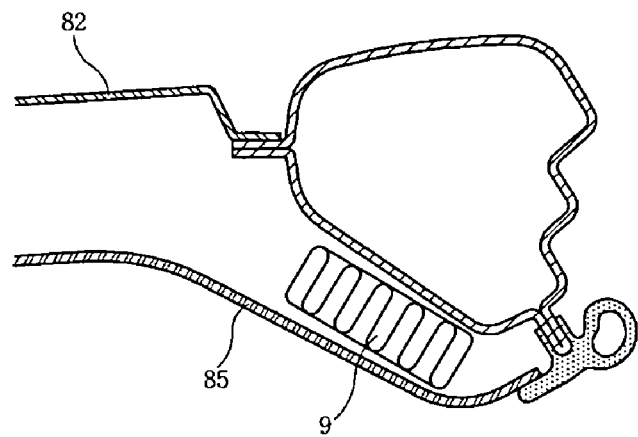
FIG. 3 is a cross-sectional view taken along a line B-B of FIG. 1.

FIG. 1 is a perspective view of an A-pillar in which a curtain airbag is installed. FIG. 2 is a cross-sectional view taken along a line A-A of FIG. 1. FIG. 3 is a cross-sectional view taken along a line B-B of FIG. 1. Referring to FIG. 1, a curtain airbag 9 is disposed above a side glass of a vehicle along an A-pillar 81, and it is deployed in response to a broadside collision so as to spread out along a side surface within a vehicle. Referring to FIG. 2, the airbag 9 is installed within an A-pillar trim 84 in a portion of the A-pillar 81 of a portion of a frame of a windshield glass 83. Referring to FIG. 3, the airbag 9 is installed within an indoor roof member 85 in a portion of a frame in a portion of a roof 82. In particular, as shown in FIG. 2, when the airbag is deployed from a portion of the A-pillar 81 of a portion of a frame of the windshield glass 83, the A-pillar trim 84 must be separated from the A-pillar.

Figure 4:
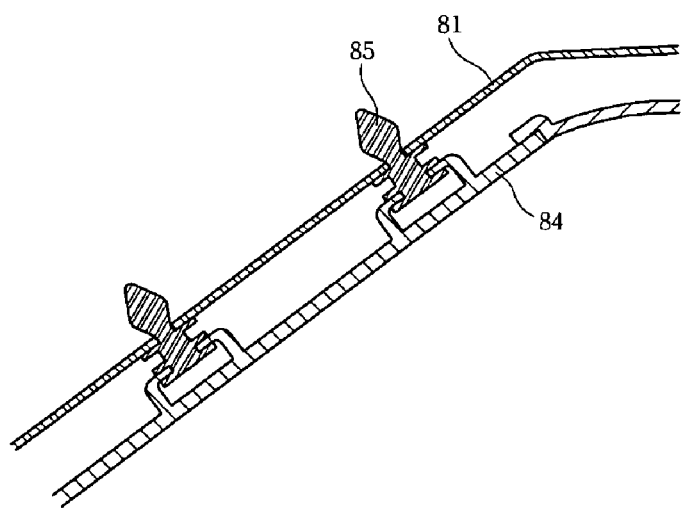
FIG. 4 is a cross-sectional view taken along a line C-C of FIG. 1 showing a conventional A-pillar trim mounting structure.
Figure 5:
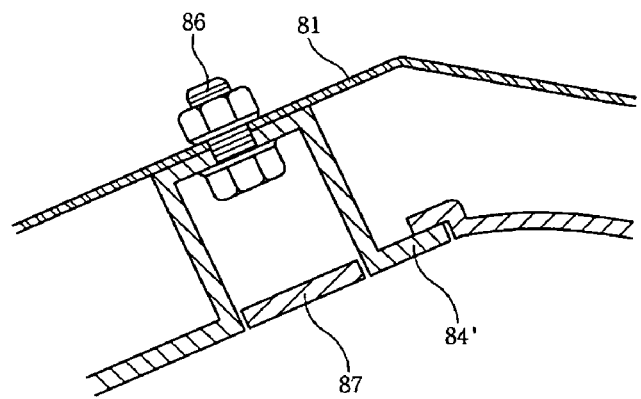
FIG. 5 is a cross-sectional view taken along a line C-C of FIG. 1 showing another A-pillar trim mounting structure.

FIG. 4 is a cross-sectional view taken along a line C-C of FIG. 1 showing a conventional A-pillar trim mounting structure, and FIG. 5 is a cross-sectional view taken along a line C-C of FIG. 1 showing another A-pillar trim mounting structure. In a structure as shown in FIG. 4, the A-pillar trim 84 is fitted into the A-pillar 81 by a fitting member 85. In a conventional structure as shown in FIG. 4, if the airbag 9 is deployed, the fitting member 85 is separated so that the A-pillar trim 84 is separated. At this time, the trim is separated to go away by deployment of the airbag, and the separated trim may collide with a passenger so that the passenger may be hurt. In addition, in a structure as shown in FIG. 5, a boss is formed in an A-pillar trim 84', and an upper end of the boss is coupled to the A-pillar 81 by a bolt 86. A cap 87 covers a lower end of the boss. In a structure as shown in FIG. 5, it is difficult for the curtain airbag 9 to be deployed, and the A-pillar trim 84' is broken during deployment of the airbag so that the curtain airbag may be damaged or a passenger may be hurt by being hit by the broken trim. In addition, the cap 87 may be scattered to hurt a passenger.

Figure 6:
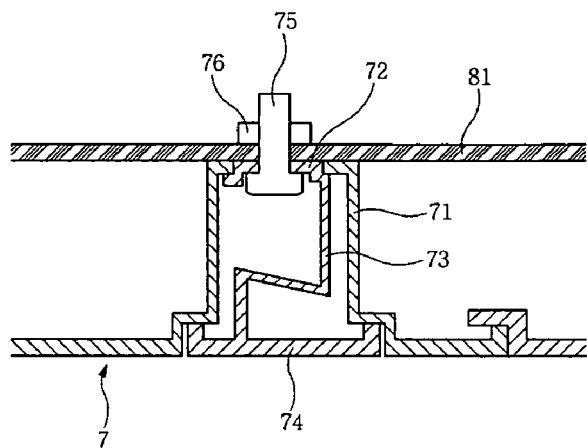
FIG. 6 is a cross-sectional view taken along a line C-C of FIG. 1 showing an A-pillar trim mounting structure according to an embodiment of the present invention.

FIG. 6 is a cross-sectional view taken along a line C-C of FIG. 1 showing an A-pillar trim mounting structure according to an embodiment of the present invention.

Figure 7:
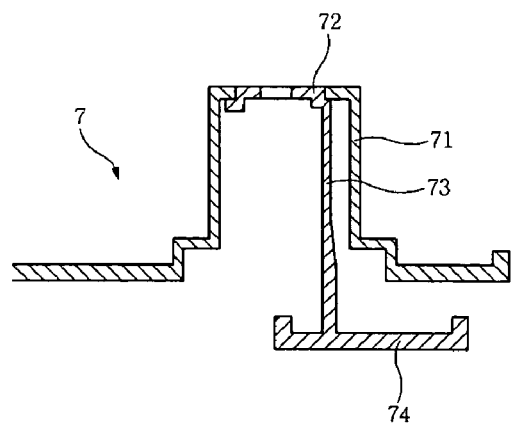
FIG. 7 is a cross-sectional view of an A-pillar trim of FIG. 6.

FIG. 7 is a cross-sectional view of an A-pillar trim of FIG. 6. Referring to FIG. 7, a boss 71 formed to be coupled with an A-pillar is formed in an A-pillar trim 7, and a mounting member 72 having a coupling hole for being coupled with the A-pillar is installed at an upper end of the boss 71. A tether member 73, which prevents cap scattering is connected to a cap 74 so as to prevent the cap 74 from being scattered and is formed at one end of the mounting member 72. The tether member 73 is preferably formed to have different thicknesses such that it can be easily folded, and the drawing shows that the tether member 73 has a three-staged thickness. First, a method for mounting the A-pillar trim 7 to an A-pillar 81 will be briefly explained, and it will be explained in more detail later.

Referring to FIG. 6, a bolt 75 is inserted into a coupling hole of the mounting member 72 which is coupled to the boss 71 of the A-pillar trim in a state as shown in FIG. 7. The bolt is then coupled to a welding nut 76 of the A-pillar 81. Then, while folding the tether member 73, the cap 74 is fitted into a lower end portion of the boss 71 of the A-pillar trim 7.

Figure 8:
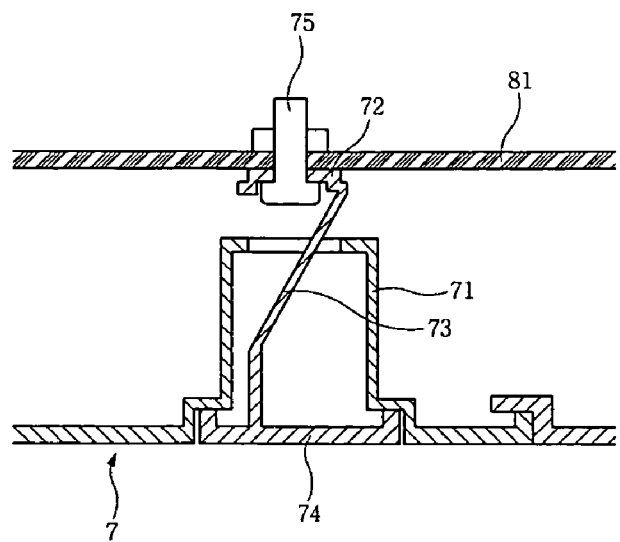
FIG. 8 is a cross-sectional view showing a state in which an A-pillar trim is separated after an airbag has been deployed.

FIG. 8 is a cross-sectional view showing a state in which an A-pillar trim is separated during deployment of an airbag. FIG. 8 shows a state of the A-pillar trim 7 after an airbag has been deployed. During the deployment of an airbag, the mounting member 72 is fixed by the bolt 75 and is maintained to be coupled to the A-pillar 81. However, the boss 71 is separated from the mounting member 72 by the pressure during the deployment of an airbag. Since the cap 74 fits into the lower end of the boss 71 and is connected to the mounting member 72 through the tether member 73, the cap 74 is prevented from being scattered. Additionally, the cap 74 is prevented from being far away from the A-pillar 81 such that the A-pillar trim 7 can be separated from the A-pillar with a constant interval.

This makes the A-pillar trim 7 easily separable from the A-pillar so as to prevent the trim 7 from being broken into sharp bits and to prevent the trim 7 and the cap 74 from being far away to collide with a passenger. In addition, since the A-pillar trim 7 can be integrally manufactured and assembled, the A-pillar trim can be easily assembled.

Figure 9:
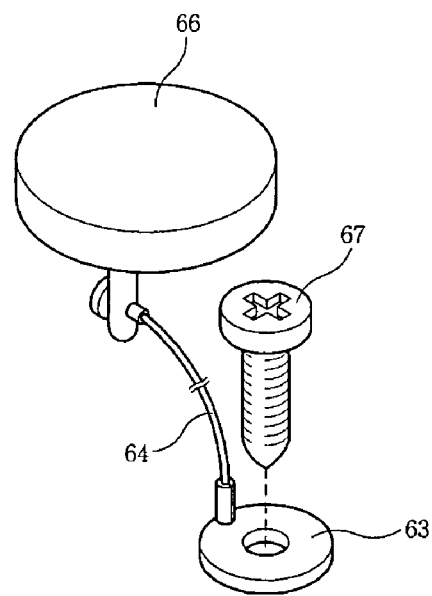
FIG. 9 is a perspective view of a cap structure for mounting an A-pillar trim according to another embodiment of the present invention.

FIG. 9 is a perspective view of a cap structure for mounting an A-pillar trim according to another embodiment of the present invention. FIG. 10 is cross-sectional views showing a process of mounting an A-pillar trim using a cap of FIG. 9. FIG. 11 is a cross-sectional view showing an A-pillar trim of FIG. 10 is separated after an airbag has been deployed.

Referring to FIG. 9, in order to prevent the cap from being scattered, a cap 66 and a washer 63 are connected to each other by a tether member 64. When coupling a bolt 67, the bolt 67 is inserted into the washer.

Referring to FIG. 10, a coupling method of an A-pillar trim 6 will be explained in detail.

Figure 10A:
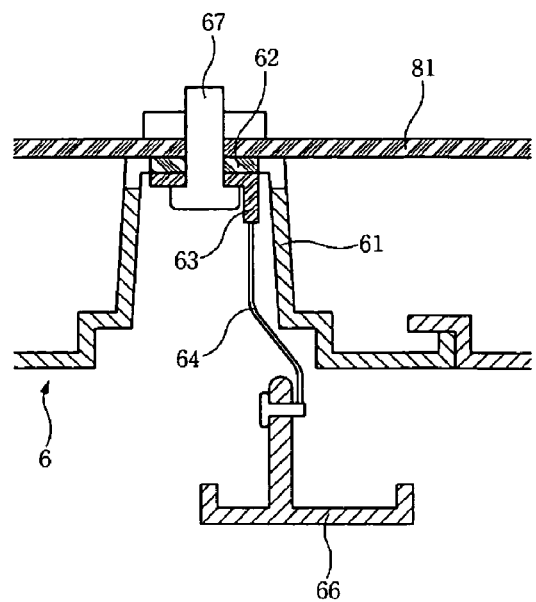
FIG. 10 is cross-sectional views showing a process of mounting an A-pillar trim using a cap of FIG. 9.
Figure 10B:
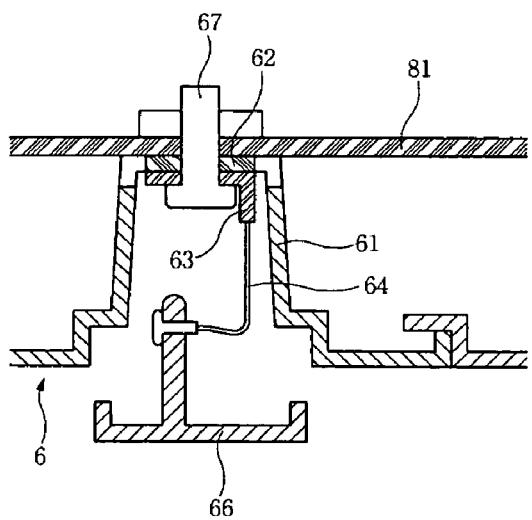
Figure 10C:
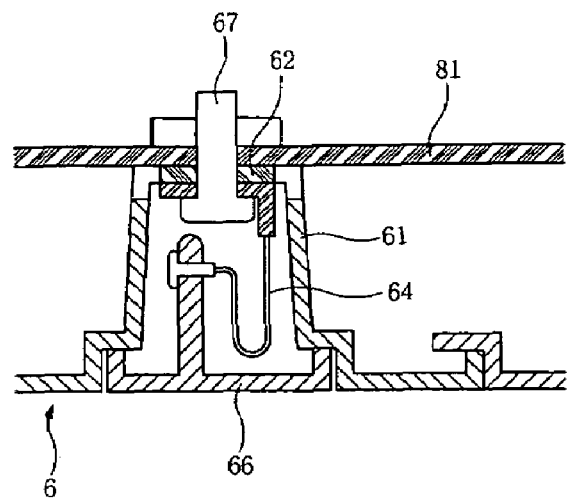
Figure 11:
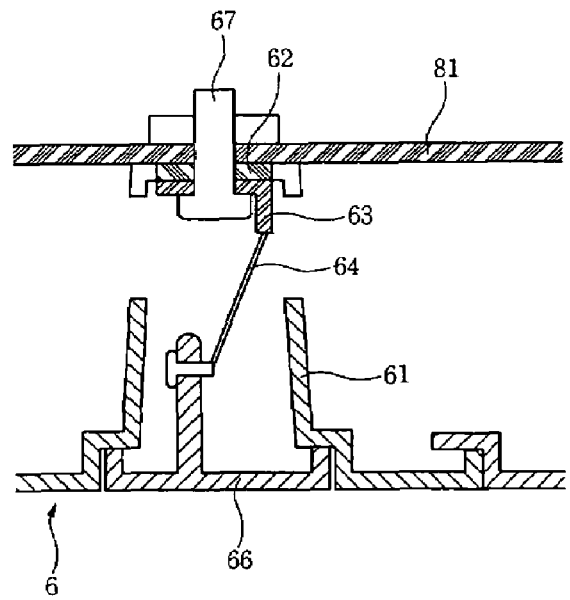
FIG. 11 is a cross-sectional view showing a state in which an A-pillar trim of FIG. 10 being separated after an airbag has been deployed.

First, as shown in FIG. 10a, when the bolt 67 is inserted into the washer 63, an upper mounting member 62 of the trim is coupled to the A-pillar 81 by the bolt 67. Subsequently, while a cap 66 is well matched with a lower end of a boss 61 of the A-pillar trim 6 as shown in FIG. 10b, the cap 66 is fitted into the lower end of the boss 61 as shown in FIG. 10c.

Referring to FIG. 11, since the tether member 64 connects the washer fixed by the bolt 67 and the cap 66, the trim 6 is held by the cap 66 even when the boss 61 of the trim 6 is separated from the mounting member 62. Accordingly, the trim 6 is separated from the A-pillar 81 with a constant interval, such that the trim 6 is prevented from colliding with a passenger.

Therefore, according to another embodiment of the present invention, the A-pillar trim 6 and the cap 66 can be prevented from being separated to collide with a passenger, so that a passenger can be prevented from being hurt by the separated trim 6.

Next, a connection between the boss of the A-pillar trim and the mounting member will be explained.

Figure 12:
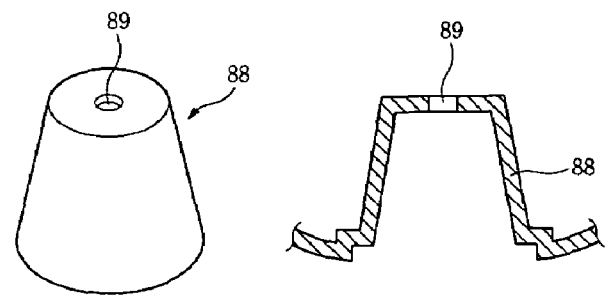
FIG. 12 is a perspective view and a cross-sectional view showing a conventional upper mounting boss of an A-pillar trim.
Figure 13:
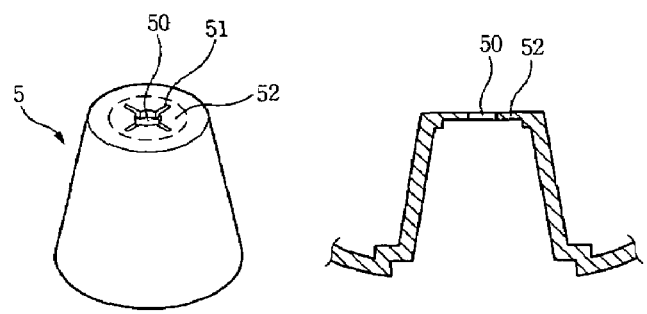
FIG. 13 to FIG. 15 respectively are perspective views and cross-sectional views showing an upper mounting boss of an A-pillar trim.

FIG. 12 is a perspective view and a cross-sectional view showing a conventional upper mounting boss of an A-pillar trim. FIG. 13 to FIG. 15 respectively are perspective views and cross-sectional views showing an upper mounting boss of an A-pillar trim.

In a prior art, without providing a separate mounting member in a boss 88 of an A-pillar trim, a trim was coupled by a bolt coupling through a coupling hole 89. However, in the embodiments of the present invention, in order for the A-pillar trim to be separated from a coupling means such as a bolt during deployment of an airbag, it may have a structure as stated in FIG. 13 to FIG. 15.

Referring to FIG. 13, a mounting member 52 is formed in an upper portion of an A-pillar trim boss 5 which is thinner than the boss 5. The four slots 51 are radially at regular intervals which is formed in the mounting member 52 and contacts with a coupling hole 50 which is formed at a center portion of the mounting member 52. This is a structure enabling a thin portion of the mounting member 52 to easily escape from a head of the bolt. The structure of FIG. 13 can also be applied to the structures of the embodiments shown in FIG. 9 to FIG. 11.

Figure 14A:
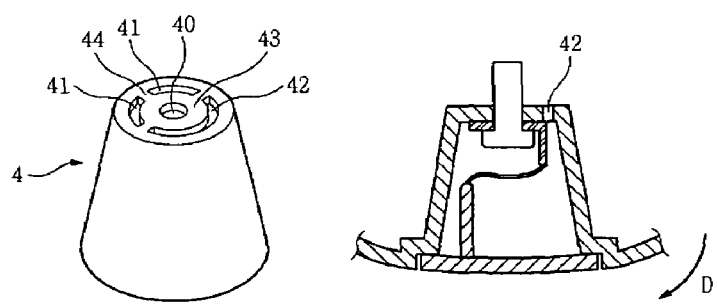

FIG. 14 shows another embodiment of the present invention. Referring to FIG. 14a, a mounting member 43 is formed at an upper portion of an A-pillar trim boss 4 which are supported by a supporting rib 44 in annulus slots 41 and 42 and spaced from a coupling hole 40 by a predetermined distance. Three supporting ribs 44 are formed at a 90 degree angle from each other in the annulus slots 41, such the slot 42 positioned at one side of the mounting member 43 is opened with an angle of 180 degrees. This determines a separation direction of the boss 4 when the boss 4 is separated from the mounting member 43 during deployment of an airbag. For example, as shown in the right portion of FIG. 14a, since slot 42 without the rib is weak, it can be estimated that the boss 4 is separated along a direction D from the right portion.

Figure 14B:
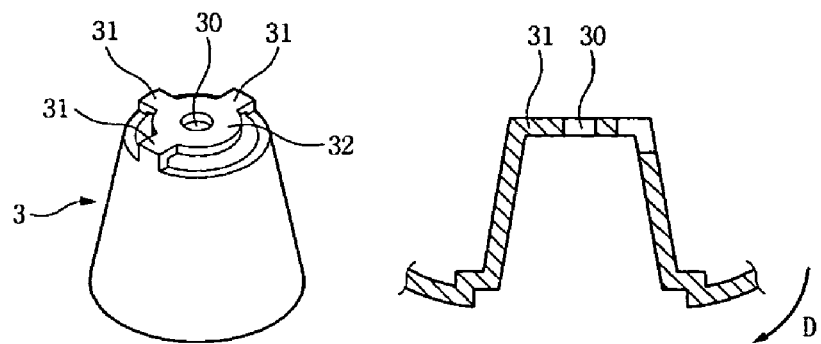

FIG. 14b shows a modified example of FIG. 14a. A boss 3 does not reach an upper surface, but it forms only a side surface, and a mounting member 32 is connected to the boss 3 by a rib 31 that is bent by a 90 degree angle. Like FIG. 14a, three ribs 31 are formed at a 90 degree angle from each other, so that one side is weaker than the other side. Accordingly, a separation direction of the boss 3 during deployment of an airbag can be determined. The structure of FIG. 14 can be applied to the embodiments of FIG. 6 to FIG. 11.

Figure 15A:
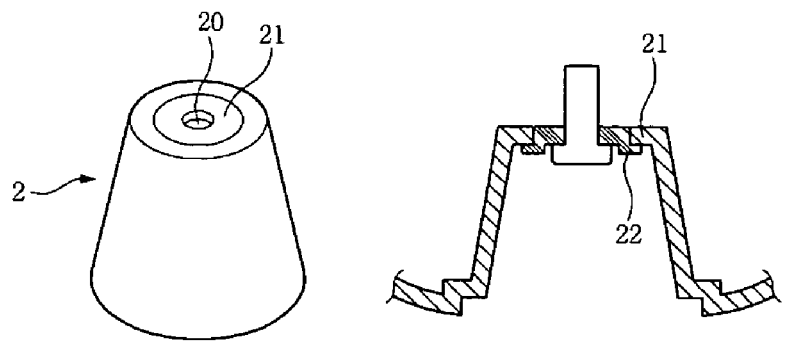
Figure 15B:
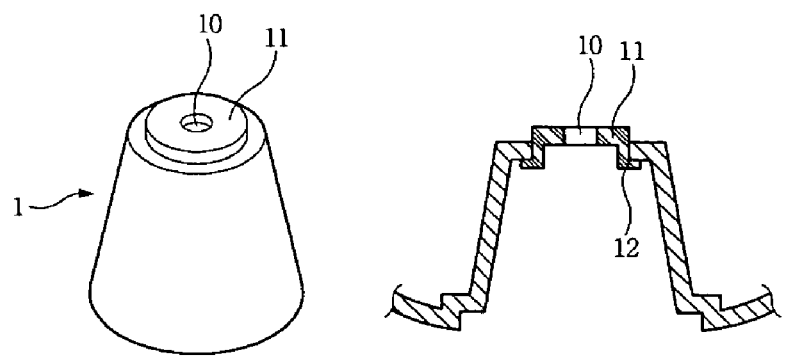

FIG. 15 shows another embodiment of the present invention. Referring to FIG. 15a, a mounting member 21 comprises a coupling hole which is inserted into the upper portion of the boss 2. An overlapping member 22 interferes with the boss 2 and is formed at a lower periphery of the mounting member 21. The distance at which the boss 2 and the mounting member 21 can be separated from each other during deployment of an airbag can be determined by the thickness of the overlapping member 22. Accordingly, it is preferable that the thickness of the overlapping member 22 is determined to have a suitable strength such that a trim is firmly fixed to an A-pillar in ordinary times and the boss 2 is separated from the mounting member 21. FIG. 15b is a modified example of FIG. 15a. The difference between FIG. 15a and FIG. 15b is that a mounting member 11 of FIG. 15b protrudes further than the upper surface of a boss 1.

The structure of FIG. 15 can be applied to the embodiments of FIG. 6 to FIG. 11.

As stated above, the A-pillar trim is firmly coupled to the A-pillar in ordinary times and the A-pillar trim is easily separated from the A-pillar without being broken. In particular, the trim separated from the A-pillar is prevented from contacting a passenger, and it can be positioned with the cap to be spaced from the A-pillar so that a passenger can be prevented from being hurt.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An A-pillar mounting structure in which a curtain airbag is installed and to which an A-pillar trim is coupled, wherein the A-pillar mounting structure comprises:
   an A-pillar trim boss for connecting the A-pillar trim to an A-pillar;
   an upper mounting member provided to an upper end of the A-pillar trim boss and formed to be separable from the A-pillar trim boss during deployment of the curtain airbag; and
   a cap,
   wherein a coupling means is fixed to the A-pillar through the upper mounting member so that the A-pillar trim is detachably coupled to the A-pillar,
   wherein the upper mounting member is integrally formed with the A-pillar trim boss which is thinner than the A-pillar trim boss, and the upper mounting member comprises a plurality of slots which are radially formed from a coupling hole formed at a center of the upper mounting member, and
   wherein the cap has a receiving portion that is formed at a lower end of the A-pillar trim boss of the A-pillar trim, and the cap is connected to the A-pillar mounting structure through a cap scattering preventing means.

2. The A-pillar mounting structure of claim 1, wherein the upper mounting member is integrally formed with the A-pillar trim boss by a plurality of supporting ribs.

3. The A-pillar mounting structure of claim 1, wherein the upper mounting member has an overlapping member and is inserted into an upper end of the A-pillar trim boss from an inner side thereof.

* * * * *